United States Patent
Lambertsson et al.

(10) Patent No.: US 10,633,600 B2
(45) Date of Patent: Apr. 28, 2020

(54) PROCESS FOR REMOVING MERCURY FROM CRUDE OIL

(71) Applicants: ConocoPhillips Company, Houston, TX (US); Umeå University, Umeå (SE)

(72) Inventors: Lars T. Lambertsson, Umeå (SE); Charles J. Lord, III, Bartlesville, OK (US); Erik L. Björn, Umeå (SE); Wolfgang Frech, Umeå (SE)

(73) Assignees: ConocoPhillips Company, Houston, TX (US); Lars T. Lambertsson (SE); Erik L. Bjorn (SE); Wolfgang French (SE)

( * ) Notice: Subject to any disclaimer, the term of this patent is extended or adjusted under 35 U.S.C. 154(b) by 0 days.

(21) Appl. No.: 16/051,973

(22) Filed: Aug. 1, 2018

(65) Prior Publication Data
US 2019/0055477 A1    Feb. 21, 2019

Related U.S. Application Data (60) Provisional application No. 62/545,653, filed on Aug. 15, 2017.

(51) Int. Cl.
  *C10G 29/20* (2006.01)
  *C10G 31/06* (2006.01)
  *B01D 19/00* (2006.01)

(52) U.S. Cl.
  CPC ......... *C10G 29/20* (2013.01); *B01D 19/0015* (2013.01); *C10G 29/205* (2013.01); *C10G 31/06* (2013.01); *B01D 2256/24* (2013.01); *B01D 2257/602* (2013.01); *C10G 2300/104* (2013.01); *C10G 2300/1033* (2013.01); *C10G 2300/1044* (2013.01); *C10G 2300/1048* (2013.01); *C10G 2300/205* (2013.01)

(58) Field of Classification Search
  CPC ...... C10G 29/20; C10G 29/205; C10G 31/06; C10G 2300/205
  See application file for complete search history.

(56) References Cited

U.S. PATENT DOCUMENTS

| 3,194,629 A | 7/1965 | Deibelbis |
| 4,518,484 A * | 5/1985 | Mann ............. C10G 21/24 208/251 H |
| 4,962,276 A | 10/1990 | Yan |
| 5,384,040 A | 1/1995 | Mank |

(Continued)

FOREIGN PATENT DOCUMENTS

TW    I590861 B    7/2017

OTHER PUBLICATIONS

International Search Report for parent case, App. No. PCT/US2018/044804, dated May 10, 2018.

(Continued)

*Primary Examiner* — Renee Robinson
(74) *Attorney, Agent, or Firm* — Boulware & Valoir (57) ABSTRACT

Methods, systems and designs are provided for removing mercury from crudes. Crude oil containing a synthetic reducing agent is heated to a temperature above 100° C. and held at that temperature for a specified period of time to convert all of the forms of mercury in the oil into the elemental mercury form. The elemental mercury is then stripped from the crude oil by e.g., flashing the hot oil and/or contacting it with a gas phase.

21 Claims, 5 Drawing Sheets

(56) References Cited

U.S. PATENT DOCUMENTS

| | | | |
|---|---|---|---|
| 6,350,372 B1 | 2/2002 | Degnan | |
| 6,537,443 B1 | 3/2003 | Frankiewicz | |
| 6,685,824 B2 | 2/2004 | Frankiewicz | |
| 6,806,398 B2 | 10/2004 | Sakai | |
| 8,080,156 B2 | 12/2011 | Cross | |
| 9,574,140 B2 | 2/2017 | Lord | |
| 2013/0306521 A1* | 11/2013 | O'Rear | C10G 29/205 |
| | | | 208/251 R |
| 2015/0218462 A1* | 8/2015 | Lord, III | C10G 31/06 |
| | | | 208/251 R |
| 2016/0333278 A9 | 11/2016 | Lord, III et al. | |

OTHER PUBLICATIONS

Mones, C; Removal of Elemental Mercury from a Gas Stream Facilitated by a Non-Thermal 17 Plasma Device; Western Research Institute; Dec. 2006.

Salvá et al (2010) SPE 138333.

Hollebone, B.P. and C.X. Yang, "Mercury in Crude Oil Refined in Canada", Environment Canada, Ottawa, ON, 2007.

* cited by examiner

Figure 1  Values from Literature for Concentrations of Mercury in Crude Oil
(range shown by vertical; average, or recommended value indicated by circle)

PROCESS FOR REMOVING MERCURY FROM CRUDE OIL

PRIOR RELATED APPLICATIONS

This application claims priority to U.S. Ser. No. 62/545,653, filed Aug. 15, 2017, which is incorporated herein in its entirety for all purposes.

FEDERALLY SPONSORED RESEARCH STATEMENT

Not applicable.

REFERENCE TO MICROFICHE APPENDIX

Not applicable.

FIELD OF THE DISCLOSURE

The disclosure generally relates to removing mercury from crude oils.

BACKGROUND OF THE DISCLOSURE

Coal is the largest source of human-generated mercury emissions in the United States. Coal-fired power plants release about 48 tons of mercury annually, according to EPA data. In contrast, the total amount of mercury in crude oil processed in the U.S. annually is less than five percent of the amount contained in U.S. coal produced and consumed annually.

Figure 1:
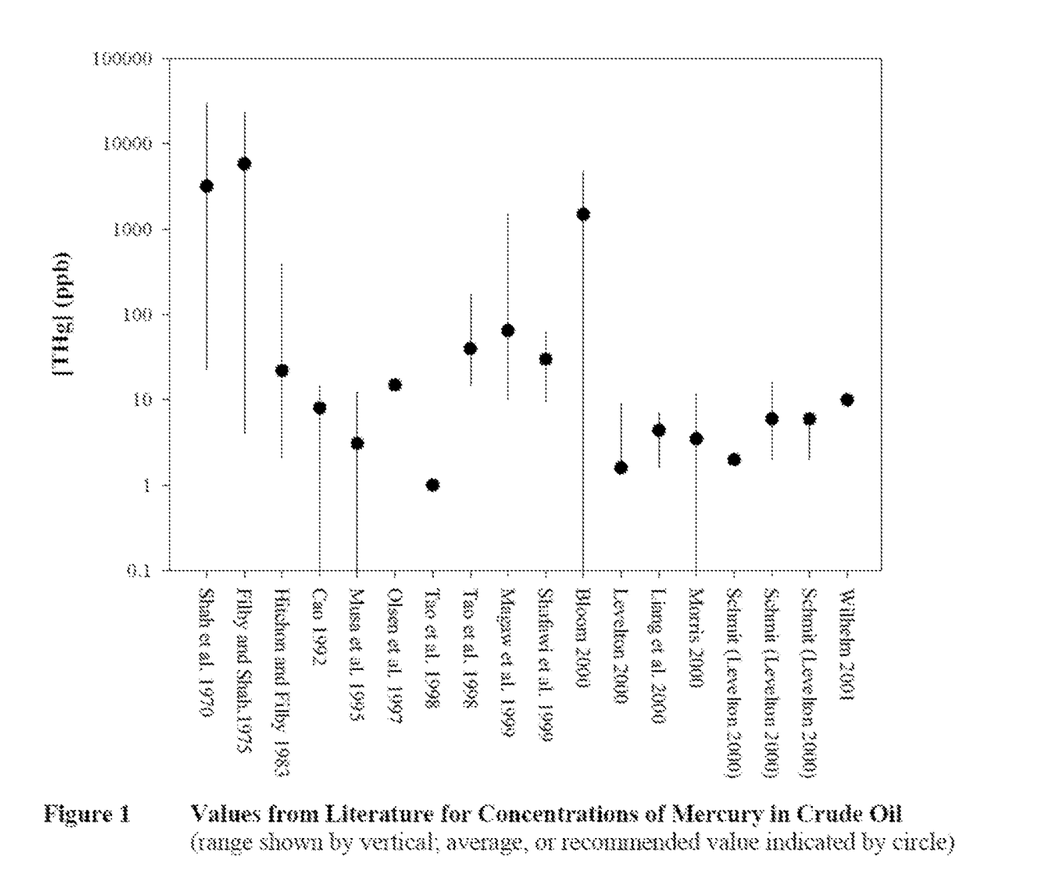
FIG. 1. Literature values of concentrations of mercury in crude oil, from Hollebone 2007.

Mercury concentrations in crude oil have been reported from as low as <1 ng/g to as high as 50,000 ng/g of oil (see e.g., FIG. 1). Some of the variability observed in crude oil mercury data is due to difficulties encountered in performing the analyses. A wide variety of measurement techniques, including neutron activation and many types of sample preparation systems coupled with detectors as diverse as mass spectrometers, ICP/MS, atomic absorption, and atomic fluorescence have been used to perform these analyses. As such, it can be very difficult to compare mercury analysis results obtained in different laboratories using different analytical techniques. The handling of samples can also significantly affect the measured results. A recent study found that the number of times a sample bottle had been opened could significantly affect the measured concentration.

Although analytical difficulties are responsible for some of the variability in crude oil mercury data, geological factors such as depositional environment and thermal history are a more important influence on the concentrations of mercury that are observed in currently produced oils. The mercury concentrations shown in FIG. 1 vary by more than a factor of 1000, which is indicative of the wide variety of environments from which these oils originate.

Mercury has come under increasing scrutiny in recent years because its presence in oil creates problems throughout the production, transportation, storage and refining systems. These problems include environmental concerns, contamination of refinery products, catalyst poisoning, corrosion of equipment, health risks for personnel, as well as expenses for disposal of contaminated tank sludge, cleaning of contaminated equipment, shipping restrictions, etc. These issues have led companies to search for methods of reducing the mercury content of crude oil.

Several processes for removing mercury from crude oil have been disclosed in U.S. Pat. Nos. 6,350,372, 6,537,443, 6,685,824, and 6,806,398 and in an article by Salvá (2010). All of these processes essentially involve reacting the crude oil with a sulfur compound to precipitate HgS and then separating the HgS particles from the oil by filtration or another technique for solids removal. In some cases, the process requires an additional filtration step prior to contacting the oil with the sulfur compound.

Such processes require the addition of reagent chemicals as well as filtration of the crude oil. The filtration step in particular is problematic because of filter plugging by other components in the crude oil such as waxes and sediments. The HgS will only comprise a small percentage of the total solids removed by filtration. The maintenance of a crude oil filtration unit can thus become cost prohibitive in terms of manpower, filtration media, and disposal.

The process disclosed in U.S. Pat. No. 8,080,156, by contrast, involves the use of natural gas to strip mercury from the crude oil. However, this process is only effective for the removal of elemental mercury. The efficiency of this process is thus limited by the ratio of elemental mercury to total mercury in the oil, and, in some cases, the efficiency of mercury removal can be very low.

In U.S. Pat. No. 9,574,140, incorporated herein in its entirety for all purposes, Applicant disclosed a method for determining the forms of mercury and their respective concentrations in a crude oil sample, which allowed for the development of a reaction rate expression for that particular crude oil feed and allowed the calculation of optimum design specifications for removal of mercury. Applicant found that crude oil can be heated to a temperature above 100° C., and held at that temperature for a specified period of time, to convert all of the forms of mercury in the oil into the elemental mercury form. The elemental mercury can then be stripped from the crude oil by e.g., flashing the hot oil and/or contacting it with a gas phase. Typically, temperatures of 180° C. or higher are required to achieve commercially useful reaction rates. The reaction rate is also strongly influenced by the composition of the crude oil. Condensates, for example, react more slowly than black oils. The ability to use the lower 100° C. temperature saves energy costs, and avoids undesired degradation of hydrocarbons.

Further improvements to methods of removing mercury are desired as companies are producing hydrocarbons from deeper and hotter reservoirs, which contain increasing concentrations of mercury, and in regions in the North Sea, Asia-Pacific, and South America, which also have elevated concentrations of mercury. Significant financial and environmental advantages exist for lowering the composition of the mercury in crude oil prior to sale.

Thus, what are needed in the art are better methods of removing mercury from crude hydrocarbons. Ideally, the methods will be simple, yet robust and applicable to all types of hydrocarbons, including crude oils, natural gas, and light condensates.

SUMMARY OF THE DISCLOSURE

This disclosure is directed to a relatively inexpensive, robust and simple process for removing mercury that is not significantly affected by the crude oil compositional variations.

Specifically, a synthetic reducing agent is added to and mixed with a crude oil (or other type of hydrocarbon matrix) that contains various forms of mercury. The mixed composition is then heated to convert the various forms of mercury in the crude oil into elemental mercury during a mercury conversion process. The synthetic reducing agent acts as a catalyst for this conversion reaction. This allows lower conversion temperatures and pressures to be used. Further, the synthetic reducing agent is able to accelerate the mercury conversion in slow reacting matrices, such as light condensates.

This process allows for the removal of all mercury forms at a moderate conversion temperature and within a commercially feasible timeframe. The lower conversion temperature reduces the capital and operating expenses that would be required for building and operating a mercury removal unit, while maintaining or increasing the output of reduced-mercury or mercury-free hydrocarbons.

In addition to crude oil, this reducing agent and process is also applicable to most hydrocarbon matrices such as natural gases, condensates, naphthas, middle distillates, and waxes.

The synthetic reducing agent converts all forms of mercury, including ionic mercury, into elemental mercury using an organic phosphite ($P(OR)_3$). These organic phosphite reducing agents are relatively inexpensive chemicals that are commonly available worldwide in bulk quantities. The use of organic phosphite reducing agents also facilitates mercury conversion in otherwise difficult matrices such as condensates and refined petroleum products.

The phosphite can have any alkyl or phenyl substituents, including methyls, ethyls, propyls, butyls, phenyls, and the like. Exemplary phosphites include triphenyl phosphite, tributyl phosphite, dibutyl phosphite, triethyl phosphite, diethyl phosphite, trimethyl phosphite, dimethyl phosphite or combinations thereof. Further, a combination of R groups with different numbers of carbons in their chain length can be used on the phosphite (i.e. $P(OR)(OR')(OR'')$) as well as having a hydrogen in place of at least one R group.

While all alkyl/phenyl-substituted phosphites were able to convert the ionic mercury to elemental mercury, the size of the substituents did affect the reaction rate. Thus, smaller alkyl substituents on the phosphite are preferred as they react more quickly with ionic mercury. Further, performance tests also revealed that the di-substituted phosphites performed better than the tri-substituted phosphites. This appears to be due to the fact that the di-substituted phosphites have significantly better thermal stability compared to their tri-substituted counterparts.

As such, the most preferred phosphite is dimethyl phosphite (($(OMe)_2P(O)H$).

By using the reaction rate expressions specific to the crude oil feed, developed in U.S. Pat. No. 9,574,140, users can calculate optimum design specifications such as process temperature, vessel sizes, oil feed rate, synthetic reducing agent feed rate, etc. for commercial-scale mixing units.

After the synthetic reducing agent is added to the mercury rich hydrocarbon, both are heated to 100° C. to convert all forms of mercury to elemental mercury. While conversion temperatures below 100° C. are possible with the use of the reducing agent, a temperature range of 100-200° C. proved optimal for establishing flexibility in designing the mercury removal unit. Higher concentrations of the synthetic reducing agent can be utilized to further decrease the reaction temperature and simultaneously increase the reaction rate. Additionally, these moderate temperatures also provide flexibility in the concentration of organic phosphites needed for highly efficient mercury removal.

Preferably, the heating occurs for a time sufficient to convert at least 95% all mercury forms to elemental mercury. Preferably 96, 97, 98, 99 or nearly 100% of the mercury is converted. The amount of time needed is variable, because the reaction rate depends on the type of hydrocarbon, the composition of the forms of mercury, the conversion temperature and the amount of reducing agent.

Following the converting step, the elemental mercury is transferred from the oil phase into a gas phase by, preferably, flashing or gas stripping, but any other method of removal can be used, and the various methods can be combined.

The removing of the elemental mercury from the gas phase after the conversion process can be by any known in the art or to be developed in the future, and in addition to the above, includes condensation, precipitation, or absorption, adsorption, and combinations thereof.

For instance, elemental mercury can be removed by precipitation as HgS. Another method includes treating the mercury rich stream with an adsorption agent. Yet another method includes removing mercury from the mercury rich stream by precipitation as HgSe after contacting the mercury rich stream with a filter containing selenium. If desired, some or all of the stripping gas can be recycled back into the process to save costs.

Key advantages of the process disclosed herein include:
The process is inherently simple and robust.
Only one chemical reagent is required to speed the conversion process.
No filtration is required.
Relatively low reaction temperatures are needed, which reduces operating costs and the risk of thermally degraded hydrocarbon components.
High removal efficiency is ensured by the conversion of non-volatile mercury species into the strippable elemental form of mercury.

This summary is provided to introduce a selection of concepts that are further described below in the detailed description. This summary is not intended to identify key or essential features of the claimed subject matter, nor is it intended to be used as an aid in limiting the scope of the claimed subject matter.

As used herein, the term "elemental mercury" means $Hg^{0+}$, which is a metallic, silvery liquid that readily breaks into droplets and easily vaporizes at room temperature. Elemental mercury is not the only volatile form of mercury, and the term does not include inorganic or organic forms of mercury.

As used herein, the term "ionic mercury" refers to mercury(II) or $Hg^{2+}$. Ionic mercury is very soluble in crude oils and is a non-volatile form of mercury. Elemental mercury, in contrast, is less soluble in crude oils and more volatile.

In addition to ionic mercury, the reducing agent can convert other non-volatile forms of mercury, such as $Hg(CH_3)_2$ (dimethyl mercury), $HgCH_3X$ (monomethyl mercury), that are commonly found in hydrocarbons into element mercury.

As used herein, the phase "conversion of mercury to elemental mercury" or "conversion of mercury in various forms to elemental mercury" means that all of the various forms of mercury found in the hydrocarbon matrix are converted to elemental mercury. This includes all non-volatile forms of organic mercury and ionic mercury, and any other forms that may be present.

The total concentration of mercury will be equal to the sum of the contributions from each of the various forms of mercury as shown below:

$$Hg_{total} = Hg^0 + Hg^{2+}_{complex} + Hg_{ads} + Hg_{other}$$

where:

Hg$_{total}$=the sum total of all the species of mercury

Hg$^0$=elemental mercury (can exist in gaseous, liquid, or solid phases)

Hg$^{2+}_{complex}$=organically-complexed ionic mercury (mercury-thiols, etc.)

Hg$_{ads}$=mercury adsorbed to solid particles or metallic surfaces

Hg$_{other}$=other forms of mercury not listed above

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
|---|---|
| Me | methyl |
| Et | Ethyl |

DESCRIPTION OF EMBODIMENTS OF THE DISCLOSURE

The invention provides a novel method of removing all forms of mercury from hydrocarbon sources. Specifically, a synthetic reducing agent comprising a phosphite is added to a hydrocarbon source containing various forms of mercury. The hydrocarbon/phosphite mixture is then heated to convert the various forms of mercury to elemental mercury, which can then be removed from the hydrocarbon source.

The present methods includes any of the following embodiments in any combination(s) of one or more thereof:

A method of removing mercury from a hydrocarbon wherein a synthetic reducing agent is mixed with a hydrocarbon comprising mercury in various forms, then heated to at least 100° C. and less than 200° C. until at least 95% of the mercury in various forms is converted to elemental mercury. The elemental mercury can then be converted to gaseous elemental mercury before removal from the hydrocarbon/reducing agent mix.

A method of removing mercury from a hydrocarbon that comprises various forms of mercury, wherein the mercury speciation is first determined and a reaction rate expression is created to express the conversion of ionic mercury to elemental mercury. Once the conversion information is determined, the hydrocarbon can be mixed with a synthetic reducing agent, then heated to about 100-200° C., depending on the conversion information, until at least 90% of the mercury in various forms is converted to elemental mercury, as calculated using the reaction rate expression. The elemental mercury can then be converted to gaseous elemental mercury before removal from the hydrocarbon/reducing agent mix.

An improved method of removing mercury from a liquid hydrocarbon stream that is mercury rich, wherein a synthetic reducing agent is mixed with the liquid hydrocarbon stream, then heating the reducing agent/liquid hydrocarbon stream to at least 100° C. and less than 200° C. until at least 90% of the mercury in various forms is converted to elemental mercury. The elemental mercury can then be converted to gaseous elemental mercury.

The gaseous elemental mercury can then be stripped from the hydrocarbon stream by contacting the stream with gas stream, such as nitrogen, methane, ethane, propane, butane, natural gas or combinations thereof. This results in a treated liquid hydrocarbon stream and a mercury rich gas stream. The mercury can there be removed from the mercury rich gas stream by precipitation as HgS if the gas stream contains hydrogen sulfide. Alternatively, mercury can there be removed from the mercury rich gas stream by precipitation as HgO.

A method of removing mercury from a hydrocarbon that contains various forms of mercury, wherein the hydrocarbon is fed into a mixer at a predetermined flow rate, along with an organic phosphite that is also fed into the mixer at predetermined flow rate. The hydrocarbon and organic phosphite can then be mixed, and fed into a thermal soak vessel. The mixture can be heated in the thermal soak vessel to at least 100° C. and less than 200° C. until at least 90 wt % of the mercury in various forms is converted to elemental mercury. The elemental mercury can then be converted to gaseous elemental mercury before removal from the hydrocarbon/reducing agent mix.

In any of the above methods, the synthetic reducing agent is an organic phosphite and can be selected from a group including, but not limited to, triphenyl phosphite, tributyl phosphite, dibutyl phosphite, triethyl phosphite, diethyl phosphite, trimethyl phosphite, dimethyl phosphite, ethyl methyl phosphite, or combinations thereof. Dimethyl phosphite is preferred.

The heating range in the above methods is expected to fall between 100 and less than 200° C. Depending on the type of hydrocarbon, heating ranges can include 100° C.-180° C. or 120-150° C. However, it can also be less than 100° C., e.g, 95°, 90°, 85°, or even 80°, depending on crude components, amount of mercury, and plant design considerations.

In any of the above methods, the elemental mercury can be converted to gaseous elemental mercury by flashing or gas stripping. The gaseous elemental mercury can then be removed by condensation, precipitation, or absorption, adsorption, or combinations thereof.

In any of the above methods, the hydrocarbon can be most hydrocarbon matrices, including but not limited to crude oil, natural gases, condensates, naphthas, middle distillates, and waxes.

In crude oil, the elemental mercury redox equilibrium, $Hg^0 \leftrightarrow Hg^{2+}+2e^-$, is shifted towards the oxidized state ($Hg^{2+}+2e^-$) at temperatures below 100° C. The equilibrium begins to shift towards the reduced state at temperatures above 100° C. Although the $Hg^{2+}$ reduction rate is too small at 100° C. to be commercially useful, the conversion to $Hg^0$ will be complete in a petroleum reservoir at that temperature because of the geologic timescale that applies to that environment (>10 million years). As such, the mercury concentration and speciation in wellhead crude oil is a function of reservoir geology and temperature.

Additionally, mercury speciation undergoes predictable changes as the physical and chemical conditions change during oil production and transport. In crude oil reservoirs at temperatures above 100° C., mercury is present only as $Hg^0$. After the crude is extracted from the reservoir and its temperature falls below 100° C., the spontaneous oxidation of $Hg^0$ to $Hg^{2+}$ will occur.

$Hg^{2+}$ is very soluble in crude oils and is a non-volatile form of mercury, making its removal more difficult. Thus, preheating oils to about 100° C. or 100-200° C. with a phosphite will convert $Hg^{2+}$ to $Hg^0$, and simplify extraction because processes to remove elemental mercury already exist.

For example, U.S. Pat. Nos. 4,962,276 and 8,080,156 disclose processes that employ gas stripping to remove mercury from condensates and crude oils. These processes, however, only work if the mercury is already in the gas strippable elemental form. As noted above, a significant portion of the mercury in a crude oil can be present in the non-volatile ionic form, and the non-volatile ionic mercury cannot be removed from a crude oil by gas stripping. Each of these methods can be used however, if proceeded by the preheat stage described herein, which converts various forms of mercury to elemental mercury.

U.S. Pat. No. 5,384,040 discloses a catalytic process for transforming mercury compounds contained in a gas condensate liquid into elemental mercury. Although not the preferred embodiment, a non-catalytic heat treatment process in the absence of hydrogen is also disclosed. The elemental mercury formed by the catalytic process is removed from the gas condensate liquid using a solid phase sorbent.

In this disclosure, a process is described for converting the various forms of mercury in a crude oil to the elemental form using a reducing agent and heat so that the mercury can be subsequently removed from the oil by gas stripping.

A range of different compounds with antioxidant/reducing properties was tested for their ability to reduce $Hg^{2+}$ and other forms of mercury in crude oil. Not all reducing agents were effective for converting ionic mercury to elemental mercury in crude oil matrices. A variety of amines, phenols, and phosphites were evaluated. Phosphites demonstrated good performance. However, the phenol and amine reducing agents did not prove to be as effective.

To further evaluate the use of phosphites as a reducing agent, a series of di- and tri-substituted alkyl and aryl phosphites with varying chain lengths or phenyl substituents were evaluated using a continuous flow reactor. The performance tests revealed that the rate of ionic mercury conversion increased as the size of the hydrocarbon substituents on the phosphite molecule decreased. In other words, the methyl-substituted phosphites reacted faster than the ethyl, butyl, and phenyl-substituted compounds. However, increasing the concentrations of the large alkyl-substituted phosphites narrowed the gap between reaction rates.

The performance tests also revealed that the di-substituted phosphites performed better than the tri-substituted phosphites. This appears to be due to the fact that the di-substituted phosphites have significantly better thermal stability compared to their tri-substituted counterparts.

Thus, the extent of mercury reduction in a given hydrocarbon matrix is therefore a function of the reaction temperature, the chemical composition of the reducing agent, the reducing agent concentration, and the length of time that the oil is allowed to react.

The present methods are exemplified with respect to crude oil in FIG. 2-5. However, this is exemplary only, and the invention can be broadly applied to any type of hydrocarbon matrix. In view of the initial findings on the reducing agent, Applicant performed a series of experiments using a di-substituted phosphite with smaller alkyl chains: dimethyl phosphite. However, other organic phosphites are expected to work well, too.

The following examples are intended to be illustrative only, and not unduly limit the scope of the appended claims.

Figure 2:
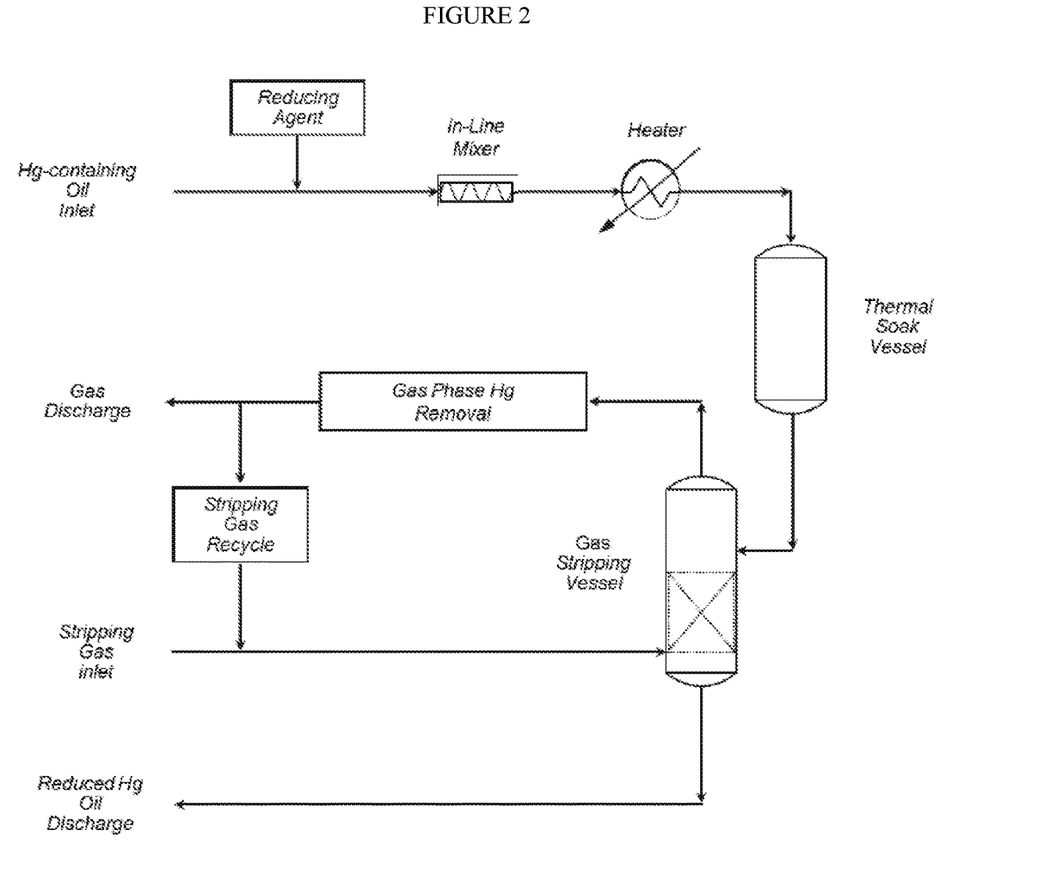
FIG. 2. Schematic of a process for removal of mercury from crude oil.

A block flow diagram of the disclosed mercury removal process is shown in FIG. 2. A mercury-containing crude oil and the reducing agent is introduced into an in-line mixer to be mixed. From there, the mixed composition is introduced into a heater to quickly and efficiently preheat the crude oil to at least 100° C.

The heated oil is then moved into a thermal soak vessel that is heated to a pre-determined temperature above 100° C. The crude remains in the heated soak vessel while the mercury species are being converted into elemental mercury.

After conversion, the crude oil flows into a gas-stripping vessel with an optional packing therein to facilitate contact between a stripping gas and crude oil. As shown in FIG. 2, the stripping gas flows from the bottom of the vessel through the oil. Any gas, such as nitrogen, methane, ethane, propane, butane, or natural gas, can be used.

As the stripping gas contacts the crude oil, the elemental mercury is removed in the form of mercury gas. The stripping gas plus mercury vapor is drawn from the top of the vessel and passed through a mercury removal unit, wherein the mercury can be removed from the stripping gas using an adsorption method (filter or scrubber). Alternative, mercury can be removed from the stripping gas via precipitation with a filter containing selenium or a gas containing hydrogen sulfide.

The mercury-free stripping gas can then be recycled. The stripped crude oil will be discharged for further processing.

Obtaining mercury speciation and kinetic information, per the methods described in U.S. Pat. No. 9,574,140, are beneficial first steps in the mercury conversion process. Speciation of the mercury provides information for understanding the fate and distribution of mercury throughout the petroleum system from reservoir rock to consumer products and how to structure the conversion. Each of the mercury species is characterized by a unique set of properties that define its toxicity, solubility, volatility, thermal stability, and reactivity. Thus, the amount of reducing agent, mixing times, and conversion temperature and time used in the process depicted in FIG. 2 should be augmented for the relative concentrations of various mercury species in a given hydrocarbon source to improve efficient conversion inexpensively.

The process for obtaining kinetic data for the conversion of mercury to the elemental form was previously described in U.S. Pat. No. 9,574,140. The rate at which mercury is thermally reduced to elemental mercury is also strongly influenced by the composition of the crude oil. Therefore, for process design purposes, it is beneficial to experimentally determine the kinetics of the mercury reduction reaction for the specific oil feed to the process.

Kinetic data for the mercury reduction reaction were obtained by spiking the oil with an enriched stable isotope of ionic mercury (e.g. $^{198}Hg^{2+}$ or $^{201}Hg^{2+}$). To accomplish this, an enriched isotope, in the form of $HgCl_2$ or $HgO$ for example, is dissolved in the oil and the rate of conversion of this ionic mercury standard to elemental mercury is monitored as a function of time and temperature. The use of an enriched isotope allows the reduction reaction to be monitored accurately even though naturally-occurring mercury may also be present in the oil.

The conversion of $Hg^{2+}$ to $Hg^0$ was monitored using enriched isotopic tracers and the mercury speciation procedure that was described above.

The results of the kinetic measurements can be used to define a reaction rate expression for a specific oil that might have a form such as:

$$[Hg^{2+}]_t = [Hg^{2+}]_i e^{-kt}$$

$$k = Ae^{-Ea/RT}$$

where: k=apparent first-order rate constant; t=time; $[Hg^{2+}]_i$=concentration of ionic mercury at time zero; $[Hg^{2+}]_t$=concentration of ionic mercury at time t; $Ae^{-Ea/RT}$ is the Arrhenius equation used to calculate the effect of temperature (T) on the reaction rate constant.

The kinetics, fluid flow and heat transfer of a process are important when upscaling for large-scale designs. To retain the same reaction rate, the other variables in the process design must be decreased or increased as necessary. For instance, increasing vessel sizes could decrease the rate, such that the temperature of the conversion must be increased to return the rate to its original value.

Figure 3:
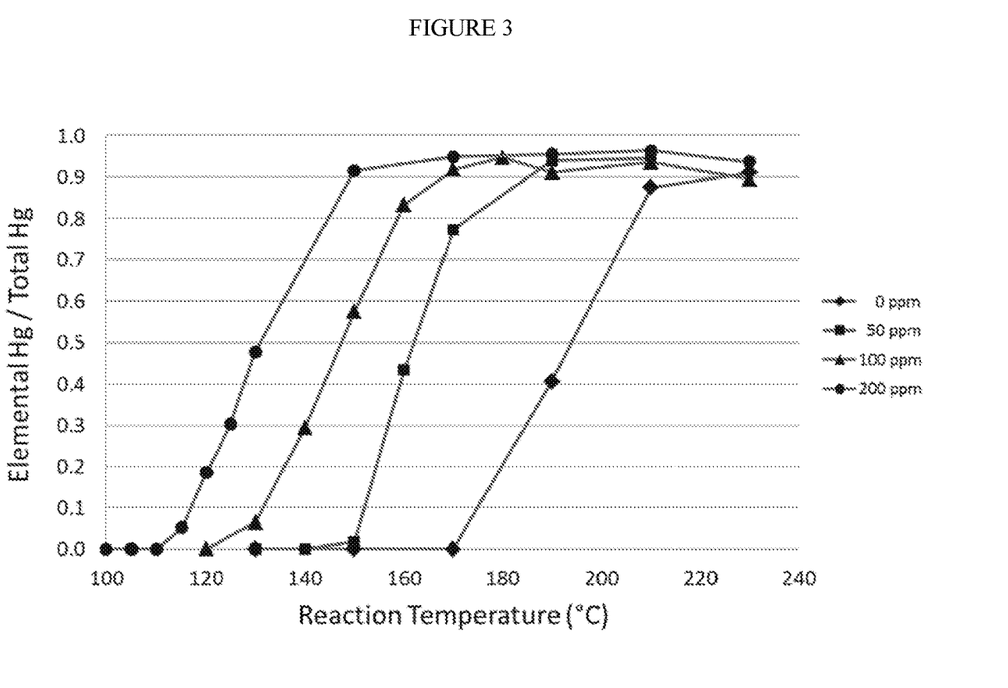
FIG. 3. Ionic to elemental mercury conversion in crude oil with various concentrations of dimethyl phosphite as the reducing agent. The reaction time was 5 minutes.

In the presently described method, the reaction rate is accelerated through the use of a reducing agent. FIG. 3 depicts the increase in mercury conversion at lower reaction temperatures and increasing concentrations of the reducing agent, dimethyl phosphite. Each reaction was 5 minutes long. As expected, the higher concentration reducing agent (200 ppm) reached at least a 90% conversion efficiency at a much lower temperature than the reaction without any reducing agent.

Even when a small amount of reducing agent was used, the reaction temperature was at least 40° C. less. This is very useful because higher reaction temperatures can lead to degradation of hydrocarbon components or the loss of lower molecular weight hydrocarbons due to evaporation.

As an example, in U.S. Pat. No. 9,574,140, increasing reaction temperature increased the amount and rate of mercury conversion. However, a balance had to be struck to prevent thermal degradation of other components in the crude oil or destruction of processing equipment.

Here, the reducing agent can be utilized to reduce the temperature needed for the conversion process, such that thermal degradation of hydrocarbons and/or evaporation of lighter weight hydrocarbons less problematic.

Figure 4:
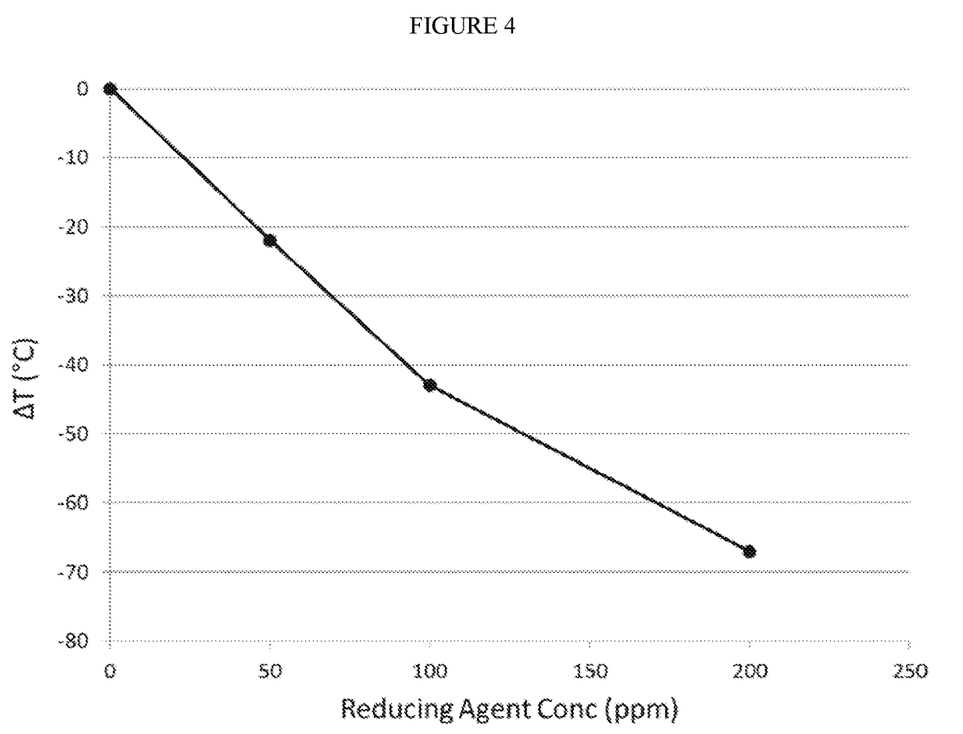
FIG. 4. Decrease in the ionic mercury reduction reaction temperature in crude oil with increasing amounts of dimethyl phosphite as the reducing agent.
Figure 5:
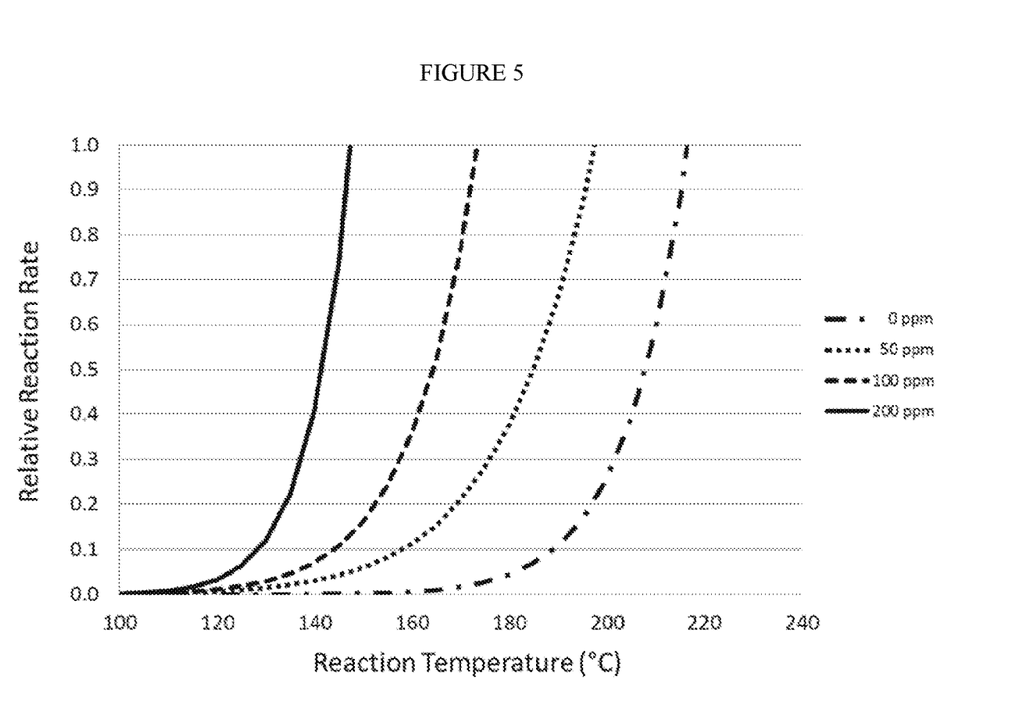
FIG. 5. Comparison of relative reaction rate in direct response to increasing dimethyl phosphite concentration.

FIG. 4 illustrates the decrease in reaction temperature after the addition of the synthetic reducing agent for a conversion efficiency of 95%. The reducing agent significantly lowers the reaction temperature compared to crude oil with no addition. At a reducing agent addition of 200 ppm for example, the reaction temperature is lowered by about 70° C. FIG. 5 illustrates the relative effect of reducing agent concentration on the rate of the ionic mercury conversion reaction.

Though shown with crude oil, the method can be applied to any hydrocarbon source. Lower molecular weight hydrocarbons such as those contained in condensates have inherently slow mercury conversion rates. By adding a reducing agent to these feedstocks, commercially attractive processing rates can be achieved.

Further, the ability to convert ionic mercury to the elemental form at lower temperatures has significant advantages in terms of reducing the capital and operating expenses that would be required for building and operating a mercury removal unit.

The reducing agent's ability to accelerate the reaction and not be significantly affected by oil compositional variations is an unexpected advantage. Thus, by adding an organic phosphite reducing agent to a hydrocarbon source, a simple, robust and cost-effective method for removing all forms of mercury is obtained.

The following references are incorporated by reference in their entirety.

Salvá et al (2010) SPE 138333.
Hollebone, B. P. and C. X. Yang, "Mercury in Crude Oil Refined in Canada", Environment Canada, Ottawa, ON, 2007.
U.S. Pat. No. 3,194,629
U.S. Pat. No. 4,962,276
U.S. Pat. No. 5,384,040
U.S. Pat. No. 6,350,372
U.S. Pat. No. 6,537,443
U.S. Pat. No. 6,685,824
U.S. Pat. No. 6,806,398
U.S. Pat. No. 8,080,156
U.S. Pat. No. 9,574,140

The invention claimed is:

1. A method of removing mercury from crude oil, comprising:
   a) mixing an organic phosphite with a crude oil comprising mercury in various forms to form a crude oil mixture;
   b) heating said crude oil mixture to at least 100° C. and less than 200° C. until at least 95% of the mercury in various forms is converted to elemental mercury;
   c) converting the elemental mercury to gaseous elemental mercury; and
   d) removing the gaseous elemental mercury from said crude oil.

2. The method of claim 1, wherein said organic phosphite is selected from a group consisting of triphenyl phosphite, tributyl phosphite, dibutyl phosphite, triethyl phosphite, diethyl phosphite, trimethyl phosphite, dimethyl phosphite, and combinations thereof.

3. The method of claim 2, wherein said organic phosphite is dimethyl phosphite.

4. The method of claim 1, wherein said heating is between 100° C.-180° C.

5. The method of claim 1, wherein said heating is between 120-150° C.

6. The method of claim 1, where said conversion of the elemental mercury to gaseous elemental mercury is by flashing.

7. The method of claim 1, where said conversion of the elemental mercury to gaseous elemental mercury is by gas stripping.

8. The method of claim 1, where said removing step is by condensation, precipitation, absorption, adsorption, or combinations thereof.

9. An improved method of removing mercury from a liquid hydrocarbon stream, the method comprising contacting a liquid hydrocarbon stream having mercury contaminants with a gas stream, wherein the gas stream strips mercury from the liquid hydrocarbon stream to thereby form a treated liquid stream and a mercury rich gas stream, wherein the improvement comprises first mixing the liquid hydrocarbon stream with an organic phosphite before heating the mixed liquid hydrocarbon stream having mercury contaminants at 100-200° C. until 90% of said mercury contaminants are converted to elemental mercury, and then contacting said heated liquid hydrocarbon stream with a gas stream to strip mercury from the heated liquid hydrocarbon stream to thereby form the treated liquid stream and the mercury rich gas stream.

10. The improved method of claim 9, wherein said organic phosphite is selected from a group consisting of triphenyl phosphite, tributyl phosphite, dibutyl phosphite, triethyl phosphite, diethyl phosphite, trimethyl phosphite, dimethyl phosphite, and combinations thereof.

11. The method of claim 9, wherein said organic phosphite is dimethyl phosphite.

12. The improved method of claim 9, wherein said gas stream is nitrogen, methane, ethane, propane, butane, or natural gas.

13. The improved method of claim 9, wherein said gas stream is a natural gas stream.

14. The improved method of claim 9, further comprising removing mercury from said mercury rich gas stream.

15. The improved method of claim 9, further comprising removing mercury from said mercury rich gas stream by precipitation as HgS, wherein said gas stream contains hydrogen sulfide.

16. The improved method of claim 9, further comprising removing mercury from said mercury rich gas stream by precipitation as HgO.

17. A method of removing mercury from crude oil, comprising:
a) determining the mercury speciation in a crude oil;
b) calculating a reaction rate expression, wherein said reaction rate expresses the conversion of ionic mercury into elemental mercury;
c) mixing an organic phosphite with said crude oil comprising mercury in various forms to form a crude oil mixture;
d) heating said crude oil mixture to about 100° C.-200° C. until at least 90% of the mercury in various forms is converted to elemental mercury, wherein said 90% conversion is calculated using said reaction rate expression;
e) converting said elemental mercury to gaseous elemental mercury; and
f) removing said gaseous elemental mercury.

18. A method of removing mercury from crude oil, comprising:
a) feeding a crude oil comprising mercury in various forms into a mixer at a predetermined flow rate;
b) feeding an organic phosphite in said mixer at a predetermined flow rate;
c) mixing said crude oil and said organic phosphite to form a crude oil mixture;
d) feeding said crude oil mixture into a thermal soak vessel;
e) heating said crude oil mixture a first time period in said thermal soak vessel to at least 100° C. and less than 200° C. until at least 90 wt % of the mercury in various forms is converted to elemental mercury;
f) converting the elemental mercury to gaseous elemental mercury; and
g) removing the gaseous elemental mercury from said crude oil.

19. The method of claim 18, wherein said organic phosphite is selected from a group consisting of triphenyl phosphite, tributyl phosphite, dibutyl phosphite, triethyl phosphite, diethyl phosphite, trimethyl phosphite, dimethyl phosphite, and combinations thereof.

20. The method of claim 18, wherein said organic phosphite is dimethyl phosphite.

21. A method of removing mercury from crude oil, comprising:
a) mixing dimethyl phosphite with a crude oil comprising mercury in various forms to form a crude oil mixture;
b) heating said crude oil mixture to at least 100° C. and less than 200° C. until at least 95% of the mercury in various forms is converted to elemental mercury;
c) converting the elemental mercury to gaseous elemental mercury; and
d) removing the gaseous elemental mercury from said crude oil.

* * * * *

UNITED STATES PATENT AND TRADEMARK OFFICE
CERTIFICATE OF CORRECTION

PATENT NO. : 10,633,600 B2
APPLICATION NO. : 16/051973
DATED : April 28, 2020
INVENTOR(S) : Lars T. Lambertsson et al.

It is certified that error appears in the above-identified patent and that said Letters Patent is hereby corrected as shown below:

In the Claims

On Column 12, Line 31 of Claim 18 should read as:
--- crude oil mixture. ---

On Column 12, Line 49 of Claim 21 should read as:
--- crude oil mixture. ---

Signed and Sealed this
Second Day of July, 2024

Katherine Kelly Vidal
*Director of the United States Patent and Trademark Office*